(12) United States Patent
Hegde

(10) Patent No.: US 9,374,839 B2
(45) Date of Patent: Jun. 21, 2016

(54) METHOD AND SYSTEM FOR PREVENTING COLLISIONS IN CONTENTION BASED NETWORKS

(71) Applicant: TEJAS NETWORKS LIMITED, Bangalore (IN)

(72) Inventor: Rohith Vijayakumar Hegde, Bangalore (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 105 days.

(21) Appl. No.: 14/227,465

(22) Filed: Mar. 27, 2014

(65) Prior Publication Data

US 2014/0293902 A1  Oct. 2, 2014

(51) Int. Cl.
*H04W 74/08* (2009.01)
*H04W 74/00* (2009.01)

(52) U.S. Cl.
CPC .......... *H04W 74/085* (2013.01); *H04W 74/006* (2013.01)

(58) Field of Classification Search
None
See application file for complete search history.

(56) References Cited

U.S. PATENT DOCUMENTS

| | | | |
|---|---|---|---|
| 9,019,823 B1 * | 4/2015 | Raparthy | H04W 28/0247 370/230 |
| 2011/0039499 A1 * | 2/2011 | Zhang | H04W 74/0833 455/67.11 |
| 2013/0201960 A1 * | 8/2013 | Kim | H04W 72/0446 370/331 |

* cited by examiner

*Primary Examiner* — Ian N Moore
*Assistant Examiner* — Lakeram Jangbahadur
(74) *Attorney, Agent, or Firm* — Barry Choobin; Patent 360 LLC

(57) ABSTRACT

The embodiments herein provide a method and system for preventing collisions in a contention based random access preambles in a communication network. The method comprises of dividing the contention based preambles into a plurality of sub-groups, categorizing a plurality of users into a plurality of sub-groups, scheduling the users within a preamble subgroup in one or more random access channel opportunities and transmitting information on the sub-groups of the preamble and the random access channel opportunities to one or more user equipments. The users within a sub-group are provided access to the set of contention based preambles dispersed in time thereby reducing the number of user equipments colliding on a single random access preamble channel.

4 Claims, 4 Drawing Sheets

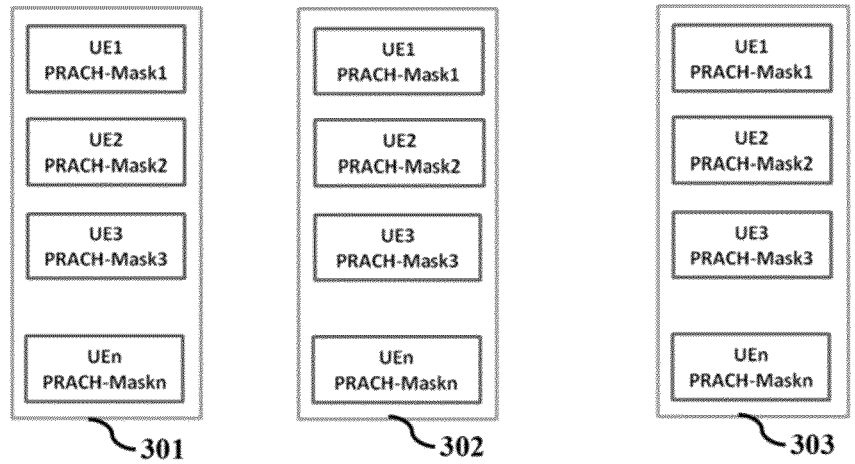

| Preamble Subgroup1 (Preamble Id 1-16) | Preamble Subgroup2 (Preamble Id 17-32) | Preamble Subgroup3 (Preamble Id 33-48) | Preamble Subgroup4 (Preamble Id 49-60) |
|---|---|---|---|
| UE1::PRACH-Mask1 | UE7::PRACH-Mask1 | UE13::PRACH-Mask1 | UE19::PRACH-Mask1 |
| UE2::PRACH-Mask2 | UE8::PRACH-Mask2 | UE14::PRACH-Mask2 | UE20::PRACH-Mask2 |
| UE3::PRACH-Mask3 | UE9::PRACH-Mask3 | UE15::PRACH-Mask3 | UE21::PRACH-Mask3 |
| UE4::PRACH-Mask4 | UE10::PRACH-Mask4 | UE16::PRACH-Mask4 | UE22::PRACH-Mask4 |
| UE5::PRACH-Mask5 | UE11::PRACH-Mask5 | UE17::PRACH-Mask5 | UE23::PRACH-Mask5 |
| UE6::PRACH-Mask6 | UE12::PRACH-Mask6 | UE18::PRACH-Mask6 | UE24::PRACH-Mask6 |

FIG. 3

METHOD AND SYSTEM FOR PREVENTING COLLISIONS IN CONTENTION BASED NETWORKS

CROSS-REFERENCE TO RELATED APPLICATIONS

This application claims the priority and benefit of an Indian Non Provisional Patent Application (NPA) with serial number 1388/CHE/2013 filed on Mar. 28, 2013 and entitled, "METHOD AND SYSTEM FOR PREVENTING COLLISIONS IN CONTENTION BASED NETWORKS" and the contents of the above application are included in its entirety herein at least by reference.

BACKGROUND

1. Technical Field

The embodiments herein generally relate to networking and particularly relate to contention based random access procedures in a wireless communication system. The embodiments herein more particularly relates to a method and system for avoiding multiple detection of the same random access preamble in a wireless communication system.

2. Description of the Related Art

A Long Term Evolution (LTE) is a new terrestrial mobile communication standard currently being standardized by the third generation partnership project (3GPP). The Radio Access Network (RAN) of LTE is named as the Evolved-Universal Mobile Telecommunication Systems Radio Access Network (E-UTRAN). The E-UTRAN physical layer is based on Orthogonal Frequency Division Multiplexing (OFDM). More precisely; the downlink transmission scheme is based on conventional OFDM using a cyclic prefix while the uplink transmission is based on single carrier frequency division multiple access (SC-FDMA) techniques. The OFDM subcarrier spacing is 15 kHz in both uplink and downlink transmission. The LTE supports both frequency division duplex (FDD) and time division duplex (TDD).

When plurality of user equipments attempt to connect to a network using a random access procedure, chances of selecting the same preamble by a plurality of user equipments (UEs) are more. Thus, the selection of same preamble by multiple UEs results in collision and in-turn results in significant delays for the UEs for which the random access attempt was unsuccessful. The collision results in utmost one (0 or 1) Random Access request being detected at the network side.

Hence, there is a need for a method and system for facilitating contention based random access to a plurality of user equipments (UEs) without colliding on a single random access preamble.

OBJECTS OF THE EMBODIMENTS

The primary objective of the embodiments herein is to provide a method and system for preventing collisions of user equipments in a contention based random access preambles in a communication network.

Another objective of the embodiments herein is to provide a method and system for reducing delay of user equipments attempting a contention based random access procedure.

Another objective of the embodiments herein is to provide a method and system to divide the contention based preambles into a plurality of sub-groups based on number of users supported by a network.

These and other objects and advantages of the embodiments herein will become readily apparent from the following detailed description taken in conjunction with the accompanying drawings.

SUMMARY

The various embodiments herein provide a method for preventing collisions in a contention based random access preambles in a communication network. The method comprises of dividing the contention based preambles into a plurality of sub-groups, categorizing a plurality of users into a plurality of sub-groups, scheduling the users within a preamble subgroup in one or more random access channel opportunities and transmitting information on the sub-groups of the preamble and the random access channel opportunities to one or more user equipments. The users within a sub-group are provided access to the set of contention based preambles dispersed in time thereby reducing the number of user equipments colliding on a single random access preamble channel.

According to an embodiment herein, dividing the contention based preambles into a plurality of sub-groups is based on a number of users supported by the network.

According to an embodiment herein, categorizing the plurality of users into one or more sub-groups is based on a distance of the user from a network.

According, to an embodiment herein, categorizing the plurality of users into a plurality of sub-groups is based on a parameter ra-Preamble Mask in IE RACH-Config Mask included in at least one of a RRC Connection Setup and RRC Connection Reconfiguration message.

According to an embodiment herein, the use equipments are assigned with different PRACH Mask values in IE RACH-Config Mask included in at least one of a RRC Connection Setup and RRC Connection Reconfiguration to disperse the random access channel opportunities in time domain.

The embodiments herein further provide a system for preventing collisions in contention based random access preambles in a communication network. The system comprises a network element comprising at least one module adapted to divide a set of contention based preambles into a plurality of sub-groups, categorize one or more users into the sub-groups, schedule the users within a preamble subgroup in different random access channel opportunities and generate and transmit the preamble and a random access opportunity information to the users. The system further comprises a user equipment comprising, at least one module adapted to receive the information on the preamble sub-group and the random access channel, process and update the preamble sub-group information and random access opportunity information, select a preamble randomly from the preamble sub-groups, determine the random access opportunity and transmit the preamble on the random access opportunity, thereby reducing the contention on the contention based preambles.

According to an embodiment herein, one or more algorithms are employed for dividing the contention based random access preambles into multiple sub-groups, for categorizing the UEs into the multiple sub-groups and for scheduling the UEs into different random access channel opportunities.

According to an embodiment herein, a method and system disclosed herein is implemented through at least one of a software module, one or more hardware components or a combination of both.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIG. 3 depicts a block diagram and a table illustrating contention based random access preambles distributed in sub-groups, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, reference is made to the accompanying drawings that form a part hereof, and in which the specific embodiments that ma be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
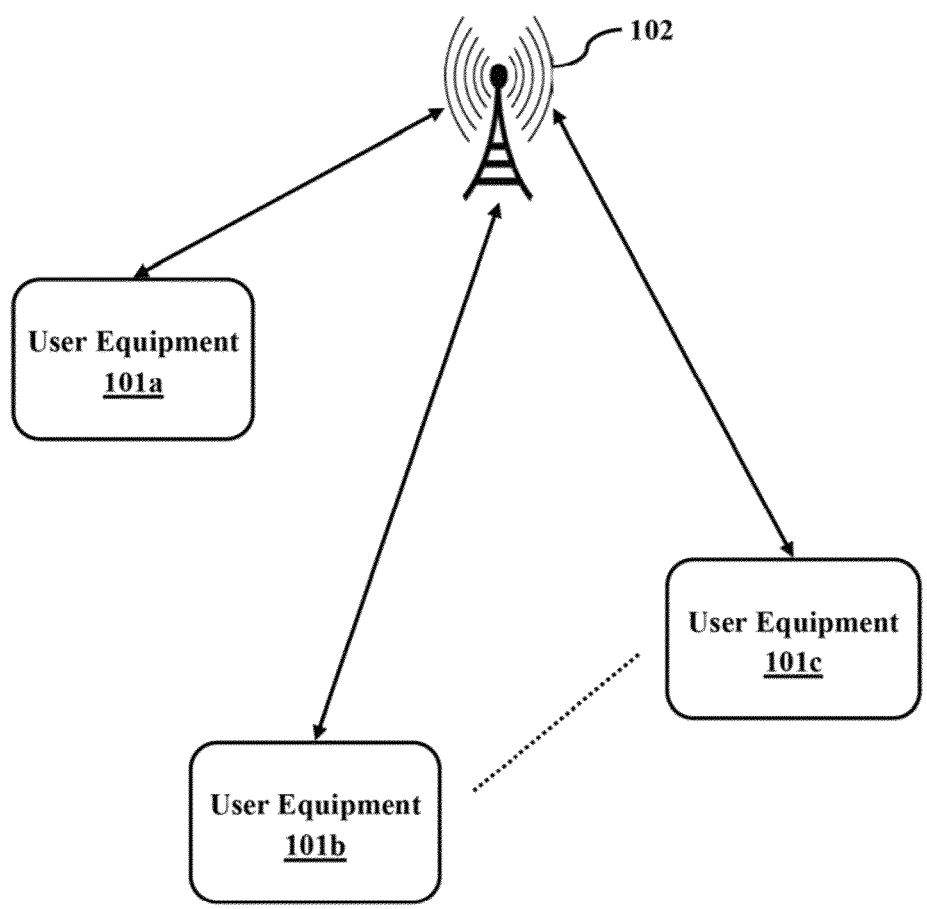
FIG. 1 is a block diagram illustrating a protocol structure of a wireless communication network, according to an embodiment herein.

FIG. 1 is a block diagram illustrating a protocol structure of a wireless communication network, according to an embodiment herein. The system for preventing collisions in contention based random access preambles in a communication network comprises a network element 102 and plurality of user equipments such as UE 101a, 101b, ... 101n in conjunction with the network element 102 as shown in FIG. 1. The network element 102 includes at least one module adapted to divide a set of contention based preambles into a plurality of sub-groups, categorize one or more users into the sub-groups, schedule the UEs within a preamble subgroup in different random access channels and generate and transmit the preamble and random access opportunity information to the users. The UEs 101a, 101b, ..., 101n attempts to connect to the communication network with the network element 102. The user equipment 101a, 101b, ... 101c comprises at least one module adapted to receive the information on the preamble sub-group and the random access channel, process and update the preamble sub-group information and random access opportunity information, select a preamble randomly from the preamble sub-groups, indicate the random access opportunity and transmit the preamble on the random access opportunity.

According to an embodiment herein, a new information Element is provided for preventing the collision between plurality of UEs in a communication network. The information element is a 'RACH-ConfigMask'.
RACH-ConfigMask ::=SEQUENCE
{ra-PreambleMask BIT STRING (size (64)), ra-PRACH-MaskIndex INTEGER (0..15)}

The 'ra-Preamble Mask' is a 64 bit string for addressing the 60 preambles. The 'ra-PRACH-Mask Index' is mask on the time resource which is used for RACH attempt. The information Element is added as an OPTIONAL parameter to 'RRC Connection Setup' and 'RRC Connection Reconfiguration' messages. The network divides the contention based preambles into a number of sub-groups.

According to an embodiment herein, when a UE attempts to connect to a communication network, the UE is categorized into one or few of the sub-groups by 'ra-Preamble Mask' parameter in IE RACH-Config Mask included in 'RRC Connection Setup' or 'RRC Connection Reconfiguration' message by 64 bit string. The 'ra-Preamble Mask' indicates the preambles the UE is allowed to use for subsequent random access procedures within that network. The network is allowed to mask the available RACH opportunities to disperse in time the UEs which are put into the same sub-group indicated through 'ra-PRACH-Mask Index' parameter in IE RACH-Config Mask included in 'RRC Connection Setup' or 'RRC Connection Reconfiguration' message. The UEs in the same sub-group are allowed to be assigned different PRACH Mask values to disperse the random access opportunities in time domain. After getting connected to the network for the first time, through IE RACH-Config Mask, the UE understands the preamble subset and RACH time resource to be used for subsequent contention based RACH procedure.

Figure 2:
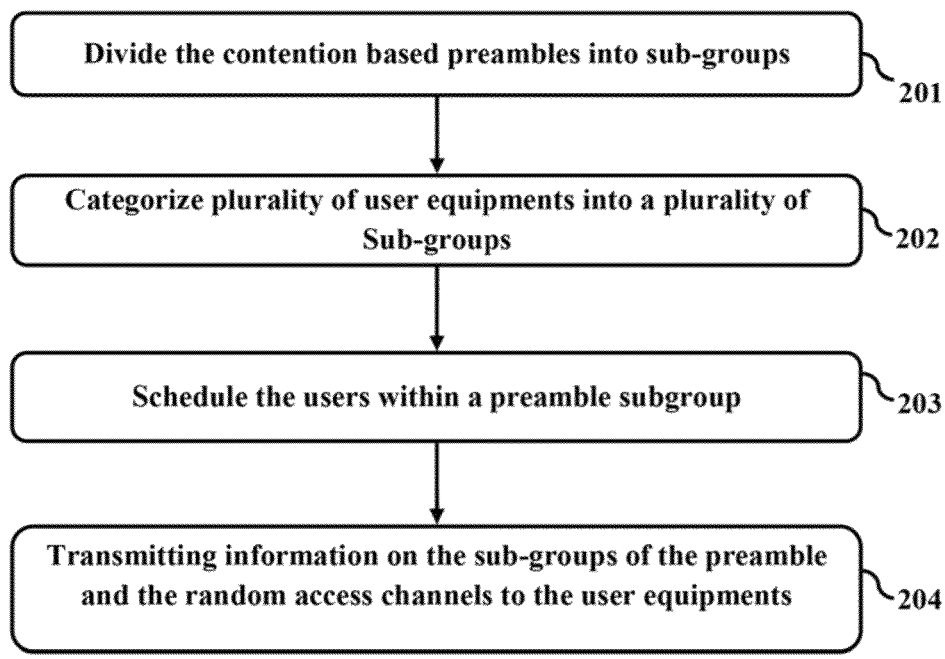
FIG. 2 is a flow chart illustrating a method for preventing collision of multiple user equipments in a communication network, according to an embodiment herein.

FIG. 2 is a now chart illustrating a method for preventing collision of multiple user equipments in a communication network, according to an embodiment herein. The method comprises dividing the contention based random access preambles into a plurality of sub-groups (201). Further the plurality of user/user equipments is categorized into a plurality of subgroups (202). Here, categorization of the plurality of equipments is based on a plurality of conditions, for instance the channel conditions experienced by the user, the distance of the user from a network and the like. After categorizing the UEs into sub-groups, the UEs within a preamble subgroup are allocated to one or more random access channels (203). The schedule defines the sequence of access by the UEs in a particular group. Further, the information on the sub-groups of the preamble and the random access channel is transmitted to the plurality of UEs (204). The UEs within a sub-group are provided access to the set of contention based preambles dispersed in time thereby reducing the number of UEs colliding on a single random access preamble channel.

FIG. 3 depicts a block diagram and a table illustrating contention based random access preambles distributed in sub-groups, according to an embodiment herein. The contention based preambles are divided into multiple sub-groups such as 301 for preamble subgroup1, 302 for preamble subgroup2, ..., 303 for preamble subgroup n with one or few sub-groups are assigned to each UE. The UEs within the sub-group are given access to the set of contention based preambles dispersed in time resulting in lesser number of UEs contending for the same set of resources at any instant resulting in lesser number of collisions and RACH attempt failures. The contention based preambles are divided in sub-groups with sixteen preambles each and is defined inside a table. The first column of the table comprises preamble sub-group1 with preamble Ids from 1 to 16 as shown in FIG. 3. The second column of the table comprises preamble sub-group2 with preamble Ids from 17 to 32. The third column of the table comprises preamble sub-group1 with preamble Ids from 33 to 48. The fourth column of the table comprises preamble sub-group1 with preamble Ids from 49 to 60. All the four sub-groups comprise six masks from 1 to 6. The PRACH mask values indicate which of the defined PRACHs the UE is allowed to use. Further, the table illustrates that the UE1 to UE6 are categorized under the sub-group1. Similarly the UE7 to UE12, the UE13 to UE18 and UE 19 to UE24 are categorized under the sub-group2, sub-group3 and sub-group4 respectively.

Figure 4:
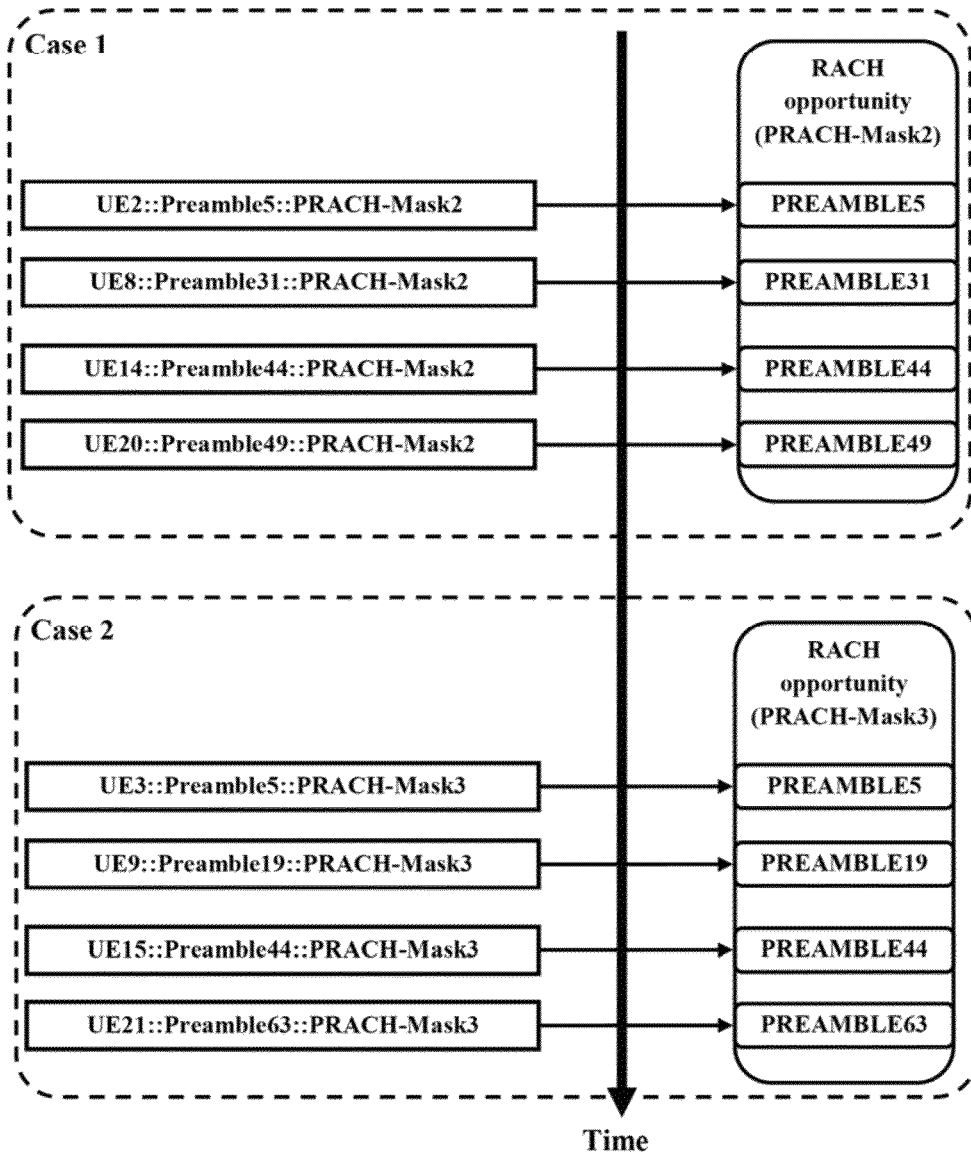
FIG. 4 is a diagram illustrating a communication between the user equipments and the network element, according to an embodiment herein.

FIG. 4 is a diagram illustrating a communication between the user equipments and the network element, according to an embodiment herein. The FIG. 4 illustrates the process of preventing collision in contention based preamble using two cases. The first case comprises all the UEs with Mask2. A UE2 selects a preamble5 by contention based random Access procedure. A UE8 selects a preamble31 by contention based random Access procedure. Similarly, a UE14 selects a preamble44 and UE20 selects preamble49 by contention based random access procedure.

The second case comprises all the UEs under Mask3. Specifically, our UEs are defined i.e. UE3, UE9, UE15 and UE21. The UE3 selects the preamble5, the UE9 selects a preamble19, the UE15 selects the preamble44 and the UE21 selects a preamble63. All the four UEs select the respective preambles by contention based random access procedure. The PRACH mask identifies which PRACH resources the UE is allowed to use for the access attempt. Specifically, the mask defines in which PRACH opportunity the UE is allowed to transmit a random access preamble.

In both the cases, the preamble5 is selected by the UE2 and UE3, whereas, the preamble44 is selected by the UE14 and UE15. Even though two UEs are attempting an access through a common preamble, the embodiments of the embodiments herein prevent collision and also provide access to the communication network.

The number of UEs colliding on a single random access preamble is considerably reduced by dividing the contention based preambles into multiple sub-groups and assigning different preamble sub-groups at different Random Access opportunities with respect to time to different UEs.

Here one or more algorithms is employed for dividing the contention based random access preambles into multiple sub-groups, for categorizing the UEs into the multiple sub-groups and for scheduling the UEs into different random access channel opportunities.

The embodiments disclosed herein are implemented through at least one of a software module, one or more hardware components or a combination of both.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the disclosure with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method of preventing collisions in contention based random access preambles in a communication network, the method comprising the following steps:
    dividing the contention based random access preambles into a plurality of sub-groups, and assigning at least one user equipment to each of the sub-groups;
    incorporating an information element into at least one of an RRC Connection Setup message and RRC Connection Reconfiguration message, said information element indicating the random access preambles a user equipment is allowed to use for accessing a random access channel (RACH), and next available RACH opportunity for the user equipment;
    selectively modifying said information element to disperse available RACH opportunities across a time domain;
    scheduling the user equipment within each of the plurality of sub-groups, in one or more random access channel opportunity, based on said information element; and
    transmitting information on the sub-groups and the random access channel opportunity to the user equipments;
    wherein the user equipments within a sub-group are provided access to the set of contention based random access preambles dispersed in time, thereby reducing the number of user equipments colliding on a single random access preamble channel.

2. The method of claim 1, wherein dividing the contention based random access preambles into the plurality of sub-groups is based on a number of user equipments supported by the network.

3. The method of claim 1, wherein categorizing the plurality of user equipments into one or more sub-groups is based on a distance of a user equipment from a network.

4. A system for preventing collisions in contention based random access preambles in a communication network, the system comprising a network element and at least one user equipment, wherein:
    said network element configured to:
        divide a set of contention based random access preambles into a plurality of sub-groups, and assign at least one user equipment to each of the sub-groups;
        generate at least one of an RRC Connection Setup message and RRC Connection Reconfiguration message and incorporate an information element into said message, wherein said information element indicates the random access preambles a user equipment is allowed to use for accessing a random access channel (RACH), and next available RACH opportunity for the user equipment;
        selectively modify said information element to disperse available RACH opportunities across a time domain;
        schedule the user equipments within a sub-group, in different random access channel opportunities, based on said information element; and generate and transmit information corresponding to the plurality of sub-groups and corresponding random access channel opportunity information to user equipments;

said user equipment, configured to:
receive information corresponding to the plurality of sub-groups and the random access channel opportunity;
process and update preamble sub-group information and random access channel opportunity information;
select a random access preamble randomly from the plurality of sub-groups;
identify a random access opportunity; and
transmit selected preamble on identified random access opportunity, thereby reducing contentions for the contention based preambles.

\* \* \* \* \*